US010742678B2

(12) United States Patent
Kesavan et al.

(10) Patent No.: US 10,742,678 B2
(45) Date of Patent: Aug. 11, 2020

(54) VULNERABILITY ANALYSIS AND SEGMENTATION OF BRING-YOUR-OWN IOT DEVICES

(71) Applicant: Cisco Technology, Inc., San Jose, CA (US)

(72) Inventors: Manikandan Kesavan, Campbell, CA (US); Plamen Nedeltchev, San Jose, CA (US); Hugo Latapie, Long Beach, CA (US); Enzo Fenoglio, Issy-les-Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 15/891,749

(22) Filed: Feb. 8, 2018

(65) Prior Publication Data
US 2019/0245882 A1 Aug. 8, 2019

(51) Int. Cl.
| | |
|---|---|
| *H04L 29/06* | (2006.01) |
| *G06N 20/00* | (2019.01) |
| *H04W 12/08* | (2009.01) |
| *H04W 12/12* | (2009.01) |

(52) U.S. Cl.
CPC ........ *H04L 63/1433* (2013.01); *G06N 20/00* (2019.01); *H04L 63/105* (2013.01); *H04L 63/20* (2013.01); *H04W 12/08* (2013.01); *H04W 12/12* (2013.01)

(58) Field of Classification Search
CPC ... H04L 63/105; H04L 63/1433; H04L 63/20; H04L 67/10; G06N 99/005; G06F 17/16
See application file for complete search history.

(56) References Cited

U.S. PATENT DOCUMENTS

| | | | |
|---|---|---|---|
| 8,918,866 B2 * | 12/2014 | Luo .................. | H04L 63/20 713/187 |
| 10,075,470 B2 * | 9/2018 | Vaidya ............... | G06F 21/554 |

(Continued)

OTHER PUBLICATIONS

Huang, et al., "Adversarial Machine Learning", In Proceedings of 4th ACM Workshop on Artificial Intelligence and Security, AISec'11, Oct. 2011, pp. 43-58, ACM.

(Continued)

*Primary Examiner* — Brian F Shaw
(74) *Attorney, Agent, or Firm* — Behmke Innovation Group LLC; James M. Behmke; James J. Wong

(57) ABSTRACT

In one embodiment, a security device maintains a plurality of security enclaves for a computer network, each associated with a given level of security policies. After detecting a given device joining the computer network, the security device places the given device in a strictest security enclave of the plurality of security enclaves in response to joining the computer network. The security device then subjects the given device to joint adversarial training, where a control agent representing behavior of the given device is trained against an inciting agent, and where the inciting agent attempts to force the control agent to misbehave by applying destabilizing policies. Accordingly, the security device may determine control agent behavior during the joint adversarial training, and promotes the given device to a less strict security enclave of the plurality of enclaves in response to the control agent being robust against the attempts by the inciting agent.

20 Claims, 5 Drawing Sheets

(56) References Cited

U.S. PATENT DOCUMENTS

| | | | |
|---|---|---|---|
| 10,587,642 B1* | 3/2020 | Herman-Saffar | ............................ H04L 63/1433 |
| 2015/0040192 A1* | 2/2015 | Kobold | ................. H04L 63/083 726/4 |
| 2016/0078365 A1* | 3/2016 | Baumard | .............. G06F 21/552 706/12 |
| 2018/0276372 A1* | 9/2018 | Crabtree | ................... G06F 8/65 |

OTHER PUBLICATIONS

Mandlekar, et al., "Adversarially Robust Policy Learning: Active Construction of Physically-Plausible Perturbations", http://vision.stanford.edu/pdf/mandlekar2017iros.pdf, Page accessed on Oct. 3, 2017, 8 pages, stanford.edu.

Meidan, et al., Detection of Unauthorized IoT Devices Using Machine Learning Techniques, arXiv:1709.04647v1, 2017, 13 pages, arxiv.org.

Pinto, et al., "Robust Adversarial Reinforcement Learning", arXiv:1703.02702v1, 2017, 10 pages, ArXiv.org.

Uther, et al., "Adversarial Reinforcement Learning", School of Computer Science, Carnegie Mellon University, http://www.cs.cmu.edu/~mmv/papers/03TR-advRL.pdf, 2003, 22 pages, Carnegie Mellon University.

Venkata, et al., "CLIPS: Customized Levels of IoT Privacy and Security", http://www.csrl.unt.edu/kavi/Research/ICSEA-2017.pdf, Page accessed on Oct. 3, 2017, 7 pages, unt.edu.

* cited by examiner

VULNERABILITY ANALYSIS AND SEGMENTATION OF BRING-YOUR-OWN IOT DEVICES

TECHNICAL FIELD

The present disclosure relates generally to computer networks, and, more particularly, to the vulnerability analysis and segmentation of bring-your-own Internet of Things (IoT) devices.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

Additionally, the number of interfaces and protocols supported by IoT devices is rapidly increasing, making the attack surface ever-growing and generally uncontrolled as there is very little knowledge ad-hoc for majority of them. For instance, environments built to protect Enterprise networks from conventional devices will be challenged to similarly work for IoT devices. For example, people will be using devices, sensor-equipped clothes, shoes, cameras, pedometers, and so forth in the enterprise environment, associating their devices with non-authorized services in an unfettered way. This will create a wealth of new services which will become a difficult security challenge to manage.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
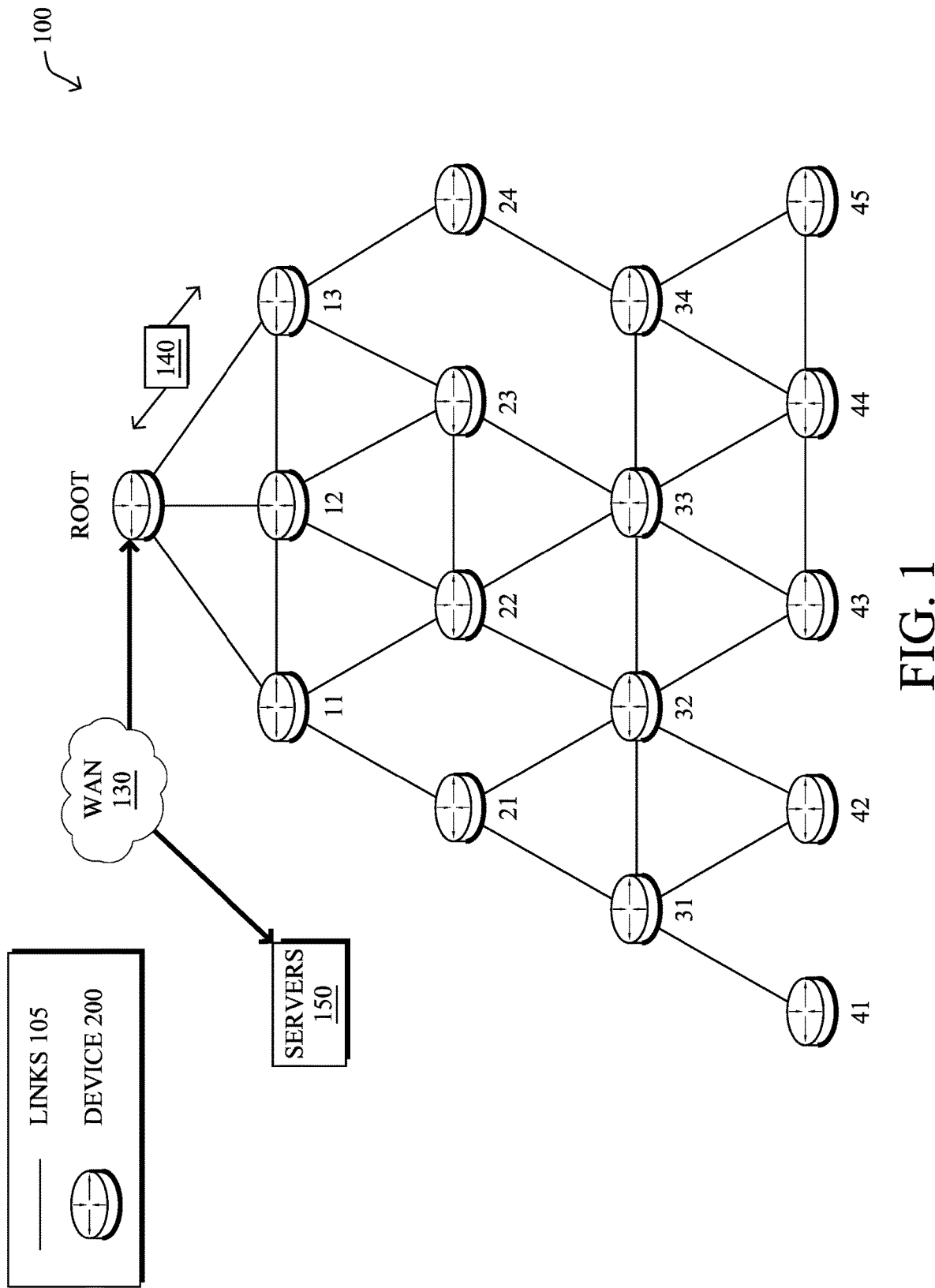
FIG. 1 illustrates an example communication network.

According to one or more embodiments of the disclosure, a security device for a computer network maintains a plurality of security enclaves for the computer network, each security enclave associated with a given level of security policies. In response to detecting a given device joining the computer network, the security device places the given device in a strictest security enclave of the plurality of security enclaves in response to joining the computer network. The security device then subjects the given device to joint adversarial training, where a control agent representing behavior of the given device is trained against an inciting agent, and where the inciting agent attempts to force the control agent to misbehave by applying destabilizing policies. Accordingly, the security device may determine control agent behavior during the joint adversarial training, and promotes the given device to a less strict security enclave of the plurality of enclaves in response to the control agent being robust against the attempts by the inciting agent based on the control agent behavior.

According to one or more additional embodiments of the disclosure, the security device continues to subject the given device to joint adversarial training throughout placement in each of the plurality of security enclaves, and can demote the given device to a stricter security enclave of the plurality of security enclaves, or promote the given device to a less strict security enclave of the plurality of security enclaves, accordingly.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on is resources such as energy, memory, computational speed and bandwidth.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc.

The illustrative Root node, such as a field area router (FARs), may interconnect the local network with a WAN 130, via which the root node may communicate with one or more other relevant devices such as management devices or servers 150, e.g., a network management server (NMS), a dynamic host configuration protocol (DHCP) server, a constrained application protocol (CoAP) server, a power outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather is the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
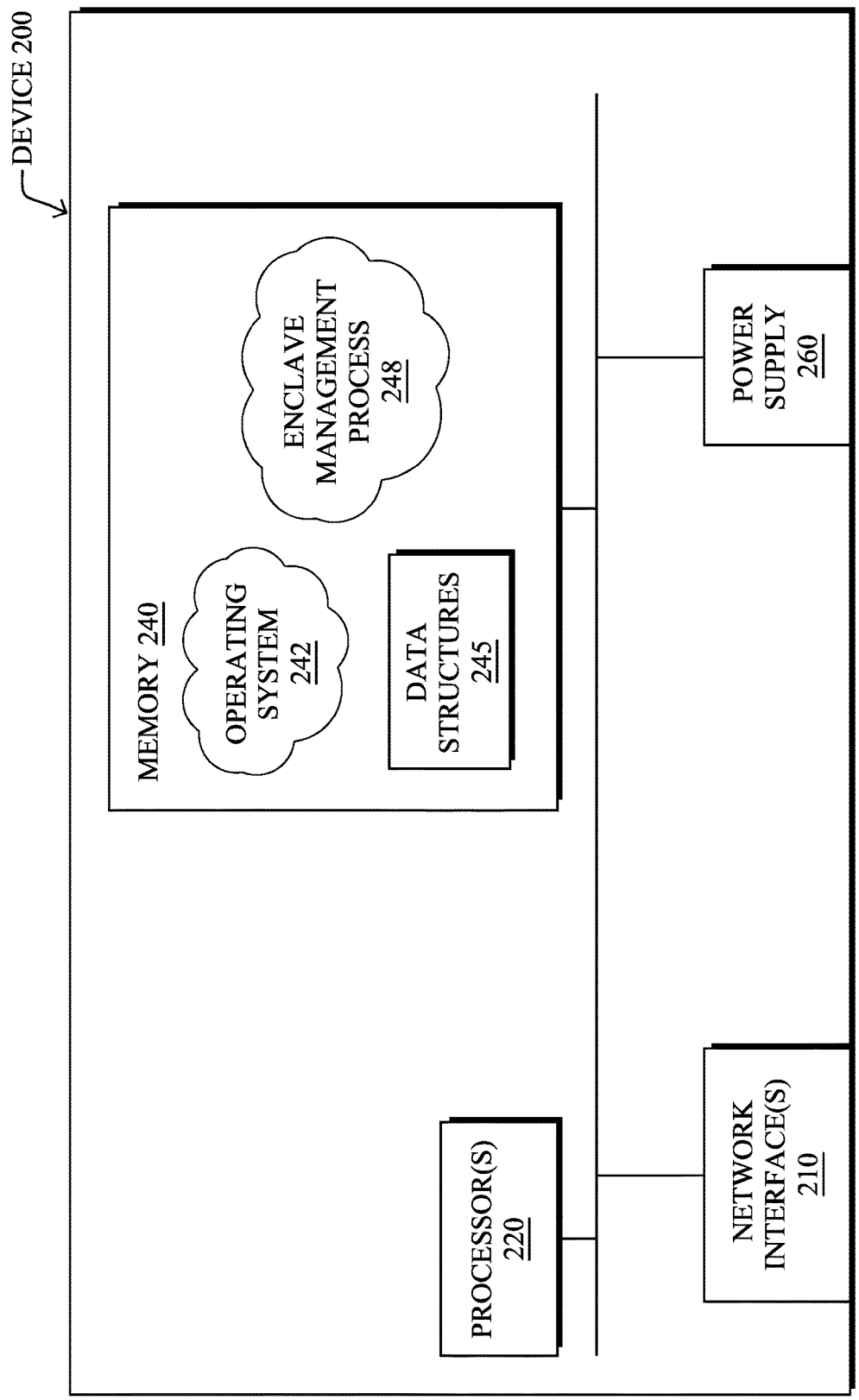
FIG. 2 illustrates an example network device/node.

FIG. 2 is a schematic block diagram of an example node/device 200 that may be used with one or more embodiments described herein, e.g., as any of the computing devices shown in FIG. 1 or any other computing device that supports the operations of network 100 (e.g., security devices, servers, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise an enclave management process 248, as described herein.

It will be apparent to those skilled in the art that other processor and memory types, including various computer-readable media, may be used to store and execute program instructions pertaining to the techniques described herein.

Also, while the is description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Enclave management process 248 includes computer executable instructions that, when executed by processor(s) 220, cause device 200 to segment entities in the network into enclaves to which different security policies are applied. For example, one such security policy may restrict the services, etc., that are available in the network to the entities in a particular quarantined enclave.

In various embodiments, enclave management process 248 may employ one or more supervised, unsupervised, or semi-supervised machine learning techniques to assign a network entity to a security enclave as described below. Generally, supervised learning entails the use of a training dataset to train the model to apply labels to the input data. For example, the training data may include sample labels indicative of the characteristics of the various entities that are to be assigned to the security enclaves (e.g., a set of labels for an entity to be quarantined, a set of labels for a trusted entity, etc.). On the other end of the spectrum are unsupervised techniques that do not require a training set of labels. Semi-supervised learning takes a middle ground approach that uses a greatly reduced set of labeled training data and attempts to infer the labels for the remaining set.

Vulnerability Analysis and Segmentation of BYO IoT Devices

As noted above, the number of interfaces and protocols supported by IoT devices is rapidly increasing, making the attack surface ever-growing and generally uncontrolled as there is very little knowledge ad-hoc for majority of them. For instance, environments built to protect Enterprise networks from conventional devices will be challenged to similarly work for IoT devices. For example, people will be using devices, sensor-equipped clothes, shoes, cameras, pedometers, and so forth in the enterprise environment, associating their devices with non-authorized services in an unfettered way. This will is create a wealth of new services which will become a difficult security challenge to manage.

Additionally, IoT Devices are known to have many security vulnerabilities. Even after a manufacturer identifies a vulnerability, a firmware upgrade is seldom executed due to lack of communication or user diligence. Typical devices owned by employees and operated freely on home-automation make their way into corporate offices, conference rooms, etc. Recently, for example a Smart Home system was hacked and a house security was compromised.

Even if not brought to office, some of these devices co-exist with VPN solutions and other Enterprise home products on the same network posing a security risk. Identifying and classifying such devices and their vulnerabilities is challenging due to the fact there is very few information on these devices, firmware manufacturers, etc. Therefore, it is necessary to not only detect and classify such devices as they enter a network, and particularly a corporate or enterprise network, but also continuously monitor to quarantine and alert when one of them turns rogue.

The techniques herein propose a methodology to continuously monitor devices in a network based on learning control behaviors established through a particular adversarial reinforcement learning mechanism. With the explosion of wearables and other IoT devices that float unfettered in a computer network (e.g., Enterprise networks), training models to detect vulnerabilities becomes very hard due to the large list of such manufactures and the device types and the less data sets available to train on. The techniques herein, therefore, propose using continuous adversarial reinforcement learning methodologies to train quickly and allow the system to be up-to-date in detecting vulnerabilities and appropriately segmenting devices into secure trust enclaves in a computer network.

Specifically, according to one or more embodiments of the disclosure as described in detail below, a security device for a computer network maintains a plurality of security is enclaves for the computer network, each security enclave associated with a given level of security policies. In response to detecting a given device joining the computer network, the security device places the given device in a strictest security enclave of the plurality of security enclaves in response to joining the computer network. The security device then subjects the given device to joint adversarial training, where a control agent representing behavior of the given device is trained against an inciting agent, and where the inciting agent attempts to force the control agent to misbehave by applying destabilizing policies. Accordingly, the security device may determine control agent behavior during the joint adversarial training, and promotes the given device to a less strict security enclave of the plurality of enclaves in response to the control agent being robust against the attempts by the inciting agent based on the control agent behavior. Notably, the security device may continue to subject the given device to joint adversarial training throughout placement in each of the plurality of security enclaves, and can demote the given device to a stricter security enclave of the plurality of security enclaves, or promote the given device to a less strict security enclave of the plurality of security enclaves, accordingly.

Illustratively, the techniques described herein may be performed by hardware, software, and/or firmware, such as in accordance with the enclave management process 248, which may include computer executable instructions executed by the processor 220 to perform functions relating to the techniques described herein, e.g., in conjunction with one or more other devices and/or processes as described herein.

Figure 3:
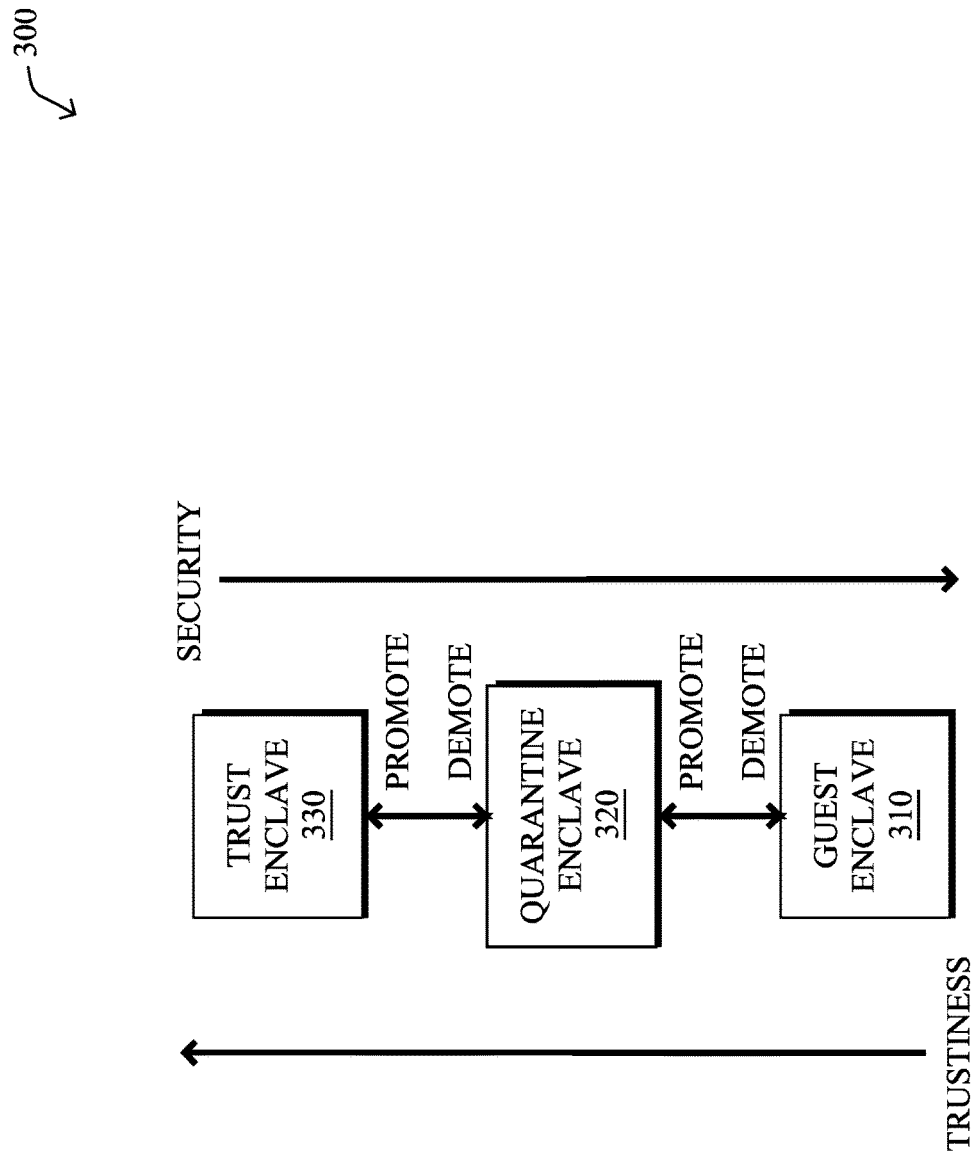
FIG. 3 illustrates an example of enclave segmentation in a network.

Operationally, as mentioned above, the techniques herein continuously monitor and identify devices in a network based on learning control behaviors established through adversarial reinforcement learning mechanisms. Illustratively, and with reference to the security enclaves structure shown in FIG. 3, devices of a computer network may be placed in one of a plurality of security enclaves 300 for the computer network, each security enclave associated with a given level of security policies. Illustrative enclaves may comprise a guest enclave 310 (e.g., generally the strictest security enclave) and a is trust enclave 330 (e.g., generally the least strict security enclave). In one or more embodiments herein, other enclaves, such as a quarantine enclave 320 between the guest enclave and trust enclave (e.g., having stricter policies than the trust enclave, but less strict policies than the guest enclave) may also be used. As described herein, devices may either be promoted into more trusted (less secured) enclaves, or demoted into less trusted (more secured) enclaves, accordingly.

Figure 4:
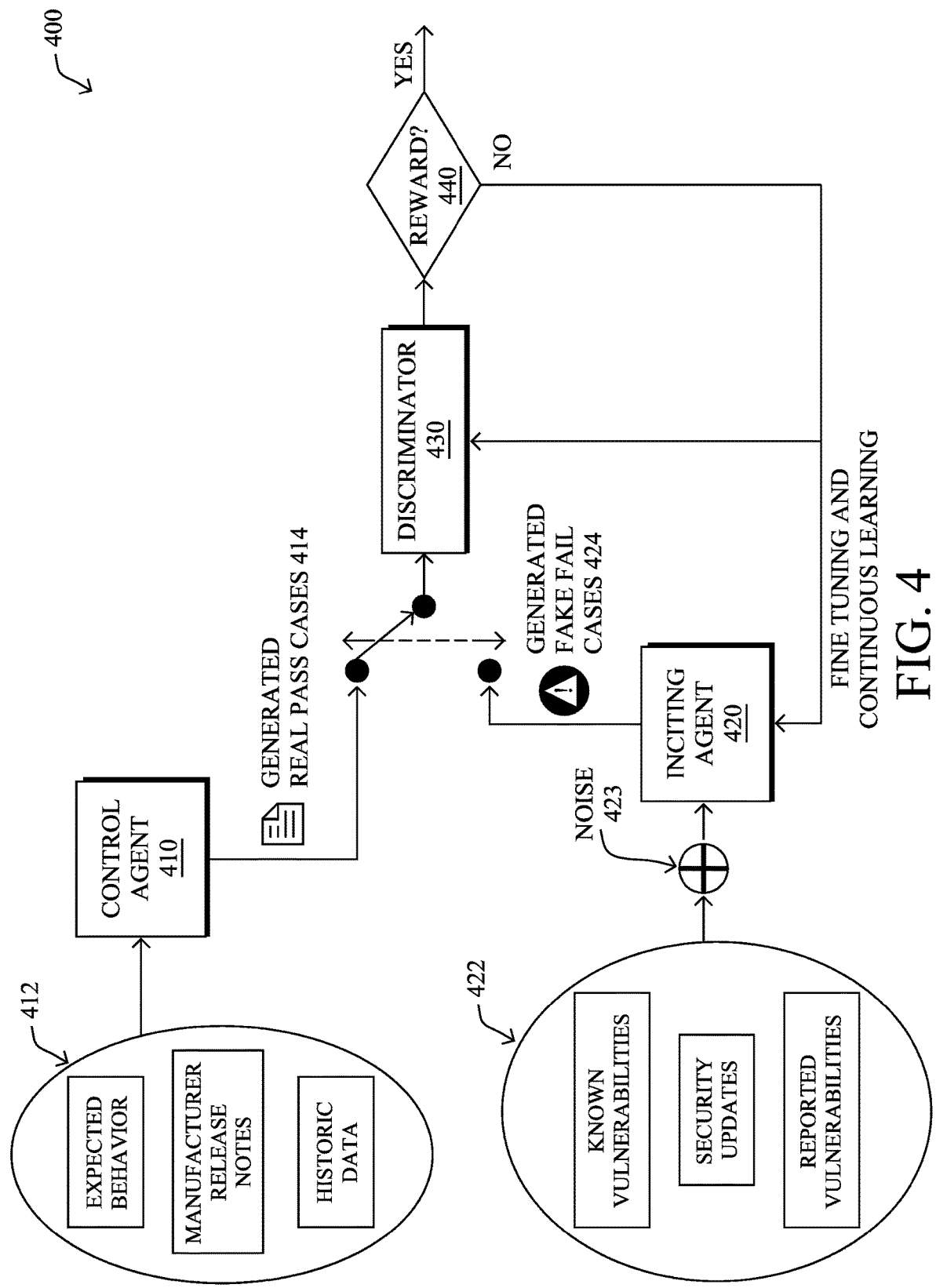
FIG. 4 illustrates an example of continuous adversarial training for detecting vulnerabilities.

With reference generally to the system 400 of FIG. 4, which illustrates an example of continuous adversarial training for detecting vulnerabilities, the techniques herein propose to learn a policy that is robust to model mismatch between training and test scenarios for continuous analysis and detection of vulnerable devices. In particular, the techniques herein model the differences during training and operational/testing scenarios using an adversarial model that learns a policy that is robust to all disturbances and changes in different training/test situations.

In one embodiment, the system, particularly a security device or other suitably responsible device, may add any new device joining the computer network into the guest enclave 310, since the device is unknown and its behavior is not documented or is otherwise incomplete, thus potentially posing a security risk to the computer network. (Note, however, that a device that belongs to the quarantine enclave 320 or trust enclave 330 may also be subjected to the same controls of a new device admitted to the guest enclave, as those devices cannot be excluded from the possibility of turning rogue in a subtler fashion after having passed the first level security check when it was admitted to the guest enclave.)

As shown in FIG. 4, in order to learn and reveal the behavior of a device in any enclaves, the techniques herein employ two adversarial agents: a control agent 410 versus an inciting agent 420, for modeling conflicting policies. This strategy avoids sampling all possibilities that will imply to have a very large dataset and consequently a very long and time-consuming training. The adversarial training allows employing fewer samples is and converging faster than a classical supervised learning approach, which is critical in a production network environment.

The behavior of the original device is represented by the control agent 410, and its adversary by the inciting agent 420. The techniques herein jointly train the control agent (the real device) against the inciting agent (a fake device), whose goal is to force the control agent to misbehave by applying destabilizing policies. The control agent 410 is based on behavioral factors 412, such as expected behavior, manufacturer release notes, historic data, and so on. The inciting agent 420, on the other hand, is based on destabilizing factors 422, such as known vulnerabilities, security updates (and thus the problems requiring the security updates), reported vulnerabilities, and so on. Optionally, some degree of noise 423 may be applied to the destabilizing factors in order to assist the training, as will be understood by those skilled in the art.

As a result of this example configuration, the control agent 410 generates real pass cases 414 for input into a discriminator 430, while the inciting agent 420 generates fake fail cases 424 for the discriminator. The inciting agent is rewarded (action 440) only for the failure of the control agent: the inciting agent learns to sample hard examples or disturbances that will make the control agent fail (i.e., "provoking" the control agent). Actually, the control agent learns a policy that is robust to any disturbances created by the adversary that in turns let it to be promoted to the next level: from guest to quarantine enclave, or to quarantine to trust enclave. It may also happen that a device in the trust enclave can be demoted to the quarantine or guest enclaves due to deciding that the control agent policy is less robust than it needs to be (e.g., newly detected or generated vulnerabilities over time, ensuring that the device hasn't gone rogue over time). Notably, the system procures and maintains the most common devices as control agents depending of their degree of membership in one of the three possible enclaves.

Illustratively, the techniques herein may use joint adversarial training on a given device behavior and its mirrored adversary, such as through using adversarial reinforcement learning (e.g., robust adversarial reinforcement learning), as will be appreciated by those skilled in the art. Notably, the data sets used for the training may be is based on behavioral analysis from continuous analysis of new devices entering the network. That is, the system analyzes and trains on new devices similar to the control one using joint adversarial training to learn and detect quickly a compromised behavior, where the data set fed to this training may be obtained through control groups of similar devices maintained in a secure environment (or trusted domain), e.g., with secure firmware updates.

Figure 5:
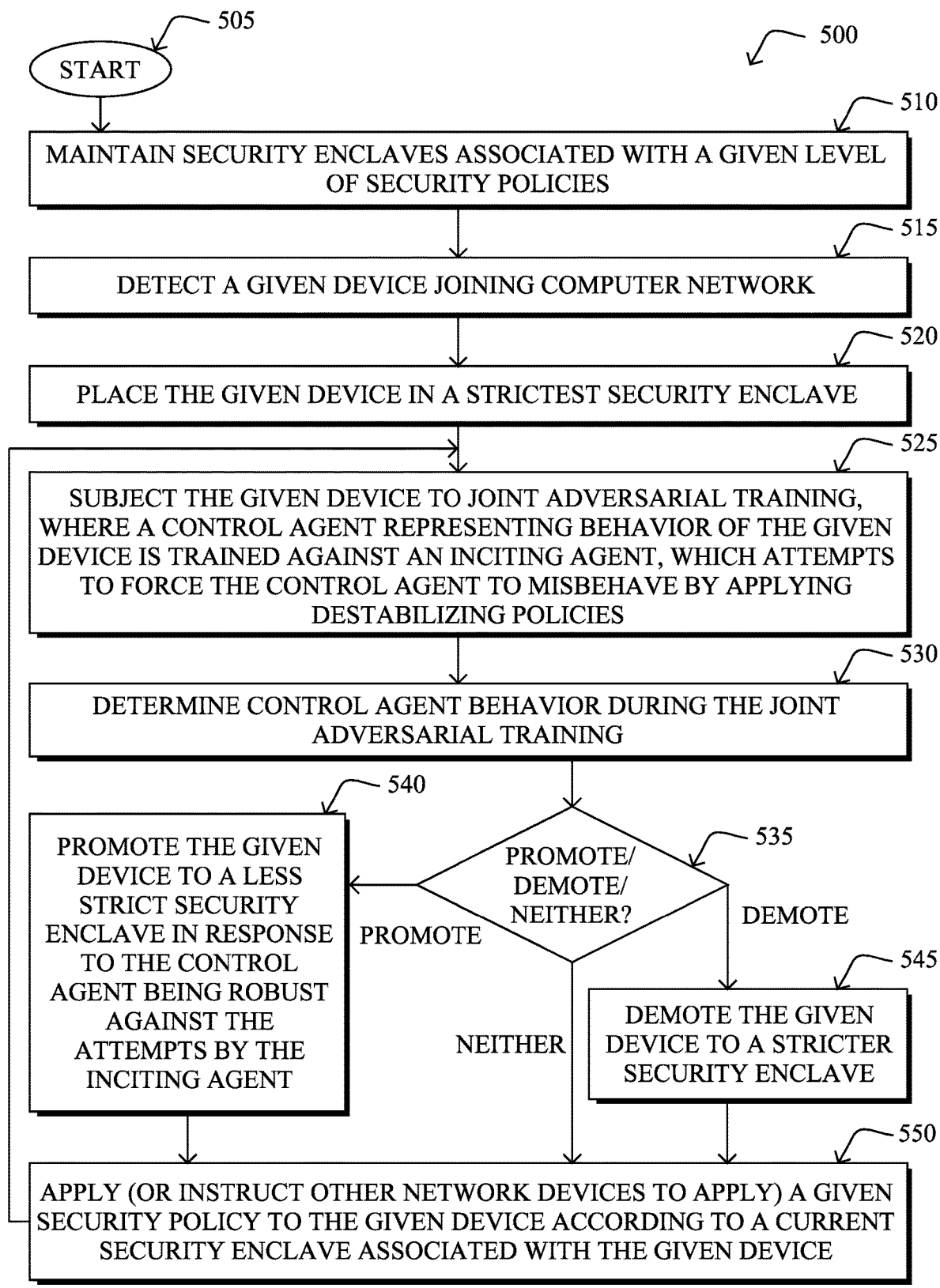
FIG. 5 illustrates an example simplified procedure for vulnerability analysis and segmentation of devices in a computer network.

FIG. 5 illustrates an example simplified procedure for vulnerability analysis and segmentation of devices in a computer network in accordance with one or more embodiments described herein. For example, a non-generic, specifically configured device (e.g., device 200, such as a security device for the computer network) may perform procedure 500 by executing stored instructions (e.g., process 248). The procedure 500 may start at step 505, and continues to step 510, where, as described in greater detail above, a plurality of security enclaves 300 are maintained for the computer network 100, each security enclave associated with a given level of security policies (e.g., guest, quarantine, and trust enclaves). In response to detecting, in step 515, a given device joining the computer network, the security device may then place the given device in a strictest security enclave of the plurality of security enclaves in step 520.

In step 525, the security device subjects the given device to joint adversarial training, where, as detailed above, a control agent representing behavior of the given device is trained against an inciting agent, which attempts to force the control agent to misbehave by applying destabilizing policies. In one embodiment, the joint adversarial training is based on unsupervised reinforcement learning, as described above, such as where the inciting agent is rewarded only for failure of the control agent (thus learning actions that make the control agent fail), and where the control agent learns a robust policy against disturbances created by actions of the inciting agent, accordingly. Note that as described above, the data set fed to the joint adversarial training may have been obtained through groups of similar devices to the given device within a secured environment.

Control agent behavior during the joint adversarial training may be determined in is step 530. As such, the security device can then determine in step 535 whether, based on the control agent behavior, to promote the given device to a less strict security enclave in step 540 (e.g., in response to the control agent being robust against the attempts by the inciting agent), or to demote it to a stricter security enclave in step 545 (e.g., in response to a detected security failure of the given device, a misbehaving control agent during continued subjecting of the given device to joint adversarial training, or in response to administrator control). Of course, in step 535, the security device may decide to do neither, i.e., keeping the given device within its current enclave.

In step 550, the security device may optionally apply (or instruct other network devices to apply) a given security policy to the given device according to a current security enclave associated with the given device. The procedure 500 may continue to step 525 to continue to subject the given device to joint adversarial training throughout placement in each of the plurality of security enclaves as described above (e.g., promoting or demoting the given device according to the behavior of the control agent in the joint adversarial training, accordingly).

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for vulnerability analysis and segmentation of bring-your-own IoT devices. In particular, the techniques herein establish security enclaves and manage device placement within those enclaves according to their level of trust. Specifically, the techniques herein follow a dynamic and continuous reinforcement learning scheme to add new devices of (un) known manufacturers, and to detect vulnerabilities based on its learned behavior in the network, where federation and distribution of the learned behavioral data set can be strengthened and improved over time. Notably, the adversarial reinforcement learning mechanism is described herein has a number of benefits, such as:
- being able to continuously collect control data to provide discriminative models for detecting unwarranted behavior in all enclaves;
- generalizing well as it learns newer devices as they enter the network as it does not depend on fixed policy;
- being robust to environmental changes between training and test conditions; and
- being able to federate the adversarial training and data set used across the network and to share it with vendors and the community generally in order to strengthen the behavioral database, allowing a robust training initialization.

While there have been shown and described illustrative embodiments that provide for vulnerability analysis and segmentation of bring-your-own IoT devices, it is to be understood that various other adaptations and modifications may be made within the spirit and scope of the embodiments herein. For example, while certain embodiments are described herein with respect to using certain segmentation categories and certain machine learning techniques to place devices within such categories, the techniques herein are not limited as such and may be used with other divisions and classifications, in other embodiments. In addition, while certain protocols are shown, other suitable protocols may be used, accordingly. Furthermore, while the techniques herein are generally described in terms of IoT (and particularly BYO IoT Devices), the embodiments herein may be applied to any suitable technology, regardless of the terminology used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on is a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
maintaining, by a security device for a computer network, a plurality of security enclaves for the computer network, each security enclave associated with a given level of security policies;
detecting, by the security device, a given device joining the computer network;
placing, by the security device, the given device in a strictest security enclave of the plurality of security enclaves in response to joining the computer network;
subjecting, by the security device, the given device to joint adversarial training, wherein a control agent representing behavior of the given device is trained against an inciting agent, wherein the inciting agent attempts to force the control agent to misbehave by applying destabilizing policies;
determining, by the security device, control agent behavior during the joint adversarial training; and
promoting, by the security device, the given device to a less strict security enclave of the plurality of enclaves in response to the control agent being robust against the attempts by the inciting agent based on the control agent behavior.

2. The method as in claim 1, further comprising:
continuing to subject the given device to joint adversarial training throughout placement in each of the plurality of security enclaves.

3. The method as in claim 1, further comprising:
demoting the given device to a stricter security enclave of the plurality of security enclaves.

4. The method as in claim 3, wherein demoting is in response to a detected security failure of the given device.

5. The method as in claim 3, wherein demoting is in response to a misbehaving control agent during continued subjecting of the given device to joint adversarial training.

6. The method as in claim 3, wherein demoting is in response to administrator control.

7. The method as in claim 1, further comprising:
applying a given security policy to the given device according to a current security enclave associated with the given device.

8. The method as in claim 1, further comprising:
instructing one or more network devices of the computer network to apply a given security policy to the given device according to a current security enclave associated with the given device.

9. The method as in claim 1, wherein the plurality of security enclaves comprise a guest enclave as the strictest security enclave, a trust enclave as the least strict security enclave, and a quarantine enclave between the guest enclave and trust enclave.

10. The method as in claim 1, wherein the joint adversarial training is based on unsupervised reinforcement learning.

11. The method as in claim 1, further comprising:
feeding a data set to the joint adversarial training that was obtained through groups of similar devices to the given device within a secured environment.

12. The method as in claim 1, wherein the inciting agent within the joint adversarial training is rewarded only for failure of the control agent, and learns actions that make the control agent fail.

13. The method as in claim 1, wherein the control agent learns a robust policy against disturbances created by actions of the inciting agent.

14. An apparatus, comprising:
one or more network interfaces to communicate with a computer network;

a processor coupled to the network interfaces and configured to execute one or more process; and a memory configured to store a process executable by the processor, the process when executed configured to:

maintain a plurality of security enclaves for the computer network, each security enclave associated with a given level of security policies;

detect a given device joining the computer network;

place the given device in a strictest security enclave of the plurality of security enclaves in response to joining the computer network;

subject the given device to joint adversarial training, wherein a control agent representing behavior of the given device is trained against an inciting agent, wherein the inciting agent attempts to force the control agent to misbehave by applying destabilizing policies;

determine control agent behavior during the joint adversarial training; and promote the given device to a less strict security enclave of the plurality of enclaves in response to the control agent being robust against the attempts by the inciting agent based on the control agent behavior.

15. The apparatus as in claim 14, wherein the process when executed is further configured to:

continue to subject the given device to joint adversarial training throughout placement in each of the plurality of security enclaves.

16. The apparatus as in claim 14, wherein the process when executed is further configured to:

demote the given device to a stricter security enclave of the plurality of security enclaves.

17. The apparatus as in claim 14, wherein the process when executed is further configured to:

apply a given security policy to the given device according to a current security enclave associated with the given device.

18. A tangible, non-transitory, computer-readable medium storing program instructions that cause a computer to execute a process comprising:

maintaining a plurality of security enclaves for a computer network, each security enclave associated with a given level of security policies;

detecting a given device joining the computer network;

placing the given device in a strictest security enclave of the plurality of security enclaves in response to joining the computer network;

subjecting the given device to joint adversarial training, wherein a control agent representing behavior of the given device is trained against an inciting agent, wherein the inciting agent attempts to force the control agent to misbehave by applying destabilizing policies;

determining control agent behavior during the joint adversarial training; and promoting the given device to a less strict security enclave of the plurality of enclaves in response to the control agent being robust against the attempts by the inciting is agent based on the control agent behavior.

19. The computer-readable medium as in claim 18, wherein the process further comprises:

continuing to subject the given device to joint adversarial training throughout placement in each of the plurality of security enclaves.

20. The computer-readable medium as in claim 18, wherein the process further comprises:

demoting the given device to a stricter security enclave of the plurality of security enclaves.

* * * * *

UNITED STATES PATENT AND TRADEMARK OFFICE
CERTIFICATE OF CORRECTION

PATENT NO. : 10,742,678 B2
APPLICATION NO. : 15/891749
DATED : August 11, 2020
INVENTOR(S) : Manikandan Kesavan It is certified that error appears in the above-identified patent and that said Letters Patent is hereby corrected as shown below:

In the Specification

Column 3, Line 8, please amend as shown:
corresponding constraints on resources such as energy, Column 3, Line 51, please amend as shown:
devices, but rather the ability to connect "objects" in Column 5, Line 1, please amend as shown:
Also, while the description illustrates various processes, it Column 5, Line 43, please amend as shown:
unfettered way. This will create a wealth of new services Column 6, Line 12, please amend as shown:
a computer network maintains a plurality of security Column 6, Line 54, please amend as shown:
security enclave) and a trust enclave 330 (e.g., generally Column 7, Line 26, please amend as shown:
employing fewer samples and converging faster than a Column 8, Line 2, please amend as shown:
data sets used for the training may be based on behavioral Column 8, Line 44, please amend as shown:
ing may be determined in step 530. As such, the security Signed and Sealed this
Eighth Day of December, 2020

Andrei Iancu
*Director of the United States Patent and Trademark Office*

CERTIFICATE OF CORRECTION (continued)
U.S. Pat. No. 10,742,678 B2

Column 9, Line 19, please amend as shown:
sarial reinforcement learning mechanism described herein Column 9, Line 61, please amend as shown:
ing on a computer, hardware, firmware, or a combination In the Claims Column 12, Line 24, Claim 18: please amend as shown:
agent based on the control agent behavior.